United States Patent [19]

Wawzonek

[11] 4,366,264
[45] Dec. 28, 1982

[54] USE OF CALCIUM METASILICATE (WOLLASTONITE) AS A FORMALDEHYDE SUPPRESSANT FOR UREA FORMALDEHYDE RESINS

[76] Inventor: Stanley Wawzonek, 2014 Ridgeway Dr., Iowa City, Iowa 52240

[21] Appl. No.: 369,148

[22] Filed: Apr. 16, 1982

[51] Int. Cl.$^3$ .............................................. C08J 9/30
[52] U.S. Cl. .................................... 521/122; 521/187; 521/188; 524/456; 524/597
[58] Field of Search ....................... 521/122, 187, 188; 524/456, 597

[56] References Cited

U.S. PATENT DOCUMENTS

| | | | |
|---|---|---|---|
| 3,231,525 | 1/1966 | Kelly et al. | 521/188 |
| 3,306,861 | 2/1967 | Justice | 521/188 |
| 3,312,639 | 4/1967 | Justice | 521/188 |
| 4,069,175 | 1/1978 | Moore | 521/187 |
| 4,267,277 | 5/1981 | Korf | 521/188 |
| 4,334,971 | 6/1982 | Mahnke et al. | 521/915 |

*Primary Examiner*—Morton Foelak
*Attorney, Agent, or Firm*—Zarley, McKee, Thomte, Voorhees & Sease

[57] ABSTRACT

Formaldehyde suppression is accomplished in urea formaldehyde foamed insulation by adding, prior to the foaming, a small but effective amount of a formaldehyde off-gassing suppressant, which is calcium metasilicate.

7 Claims, No Drawings

USE OF CALCIUM METASILICATE (WOLLASTONITE) AS A FORMALDEHYDE SUPPRESSANT FOR UREA FORMALDEHYDE RESINS

BACKGROUND OF THE INVENTION

Condensation reaction between urea and formaldehyde has been known for many years. Urea formaldehyde based insulation foams have been commercially available in the United States since at least as early as the 1950's. They were, however, at that time not widely used. In recent times, with the emphasis on energy conservation, there has been an increasingly greater use of these materials for residential insulation, and in particular, as a foamed insulation to be used in wall spaces and the like, of existing building structures.

With the increasing use of urea formaldehyde foamed insulation to increase insulating capacity, there has been concern expressed about off-gassing of formaldehyde from the insulation, after installation. It appears that temperature and humidity affect the levels of formaldehyde off-gassing. Also, there appear to be two emission phenomena occurring. The first involves a short term release of formaldehyde and the second involves a lower level, long term release.

The release of formaldehyde from the resin into the interior of a dwelling structure is undesirable. It has been linked with certain physical and biological effects. This is particularly true for low level, long term release of out-gassed formaldehyde which may expose persons inside of the insulated dwelling to potential long term risks. In fact, because of such concerns, urea formaldehyde foamed insulation has recently been banned for use in the United States.

Thus, while urea formaldehyde foamed insulations unquestionably are effective from the insulating standpoint, if they are to be used in the future, there is a real and continuing need for developing such a foamed insulation which will eliminate or minimize the out-gassing of formaldehyde, both from the standpoint of short term release and most importantly, from the standpoint of the lower level, long term gradual release.

Urea formaldehyde resins are a mixture of products from the condensation reaction between urea and formaldehyde. The first stage of the condensation is commonly carried out at 70° to 100° C. with a urea formaldehyde ratio of approximately 1.5 and a pH of from about 4 to about 8. This results in a mixture of mono and di-methylol urea. The product of this first condensation takes on a variety of forms which are dependent upon reaction conditions such as pH, temperature and the mole ratio of urea to formaldehyde. They can be prepared as syrupy, aqueous solutions, water soluble fine grain powders, or water insoluble materials which precipitate from the reaction solution. The urea formaldehyde resin mixture previously described is used for the production of urea formaldehyde foam insulation.

Three major components are necessary for production of the final foamed product, which is generated on site using portable equipment. The components are a partially polymerized urea formaldehyde resin, a foaming agent and air or nitrogen. Typically, the resin is an aqueous solution of a precondensate urea formaldehyde resin. The foaming agent is a surfactant which contains an acid catalyst or hardening agent, and the last component is air or nitrogen. The resin and the surfactant-catalyst are both water solutions. Naphthalene sulfonic acid and dodecyl benzene sulfonic acid have been used as foaming agents and phosphoric, oxalic, citric, malic, and tartaric acids have been used as the acid catalyst.

In general, generation of the foam insulation requires the use of compressed gas and a mixing or foaming gun. The process involves two events which consecutively take place in the gun. The first component comprising an aqueous solution of the foaming agent-catalyst mixture is pumped into the gun where compressed air mixes with it to form a foam of small detergent bubbles. Subsequently, the bubbles are coated in the nozzle of the gun by the urea formaldehyde resin component which is supplied from a separate line. The resin coated bubbles are forced out of the gun under pressure which results in a white foam resembling shaving cream. The resin, after mixing with the catalyst at the surface of the bubbles, begins to polymerize (cure) and within less than a minute, the resin has partially cured into a stiff, self-supporting foam.

The product as it exits from the gun is injected into the interior wall space for insulation in a dwelling. Commonly, it is injected through holes in the outer wall structure, or it may be troweled from inside before dry wall is added. Foam has also been used as insulation by filling the cavities in cinder block or in buildings.

As heretofore mentioned, a latent and intrinsic property of urea formaldehyde resin based insulation is the release of formaldehyde. This is magnified in homes using urea formaldehyde resin since a large surface area is involved, which can slowly release formaldehyde, particularly if exposed to moisture or if the resin is not properly cured. Moisture problems can cause serious effects at high humidity since this will cause hydrolysis of urea formaldehyde resins in the presence of acids used during the formation of the foam which in turn results in liberation of formaldehyde.

The specific details of forming the urea formaldehyde foam and inserting it into a building structure, are well known and do not form a part of this invention. For further information on such details, see Beat-Meyer, *Urea Formaldehyde Foamed Resins*, Addison Wesley Publishing Company, Inc. 1979, pages 185–198, which are incorporated herein by reference.

It is thus apparent that the primary objective of the present invention is to prevent urea formaldehyde off-gassing or release of formaldehyde after foaming and insulating, all in the hope that the recent ban of sales of such in the United States can be lifted, and that this highly effective insulation can once again be used.

SUMMARY OF THE INVENTION

The present invention is based on the discovery that a very specific chemical compound, that is, calcium metasilicate, or in its mineral form, wollastonite, when added as a finely divided suspension to urea formaldehyde resin, gives a foam from which the release of formaldehyde is markedly reduced. The reduction is also shown under high humidity conditions. In some instances, formaldehyde out-gassing has been virtually eliminated from the standpoint of long term release. The overall emission including short term release within a few days, and long term release decreased in most instances at least as much as 65%. Long term release may be nearly eliminated, and in every instance reduced to tolerable levels.

DETAILED DESCRIPTION OF THE INVENTION

Calcium metasilicate, CaSiO₃ is a white powder, insoluble in water. It is abundant and the mineral (Wollastonite) can be mined, as it is found in abundance in metamorphic rock. It is the formaldehyde suppressant of this invention, and appears to be unique. Other silicates such as sodium silicate and the like, will not work. Nor will sand or silicic acid by itself function as the formaldehyde depressant of this invention. Surprisingly, only calcium metasilicate is operable in this invention. It is therefore critical to the invention.

To accomplish the objective of this invention, the calcium metasilicate is added in a divided particulate form to the precondensate urea formaldehyde resin component, as heretofore described. Preferably the calcium metasilicate is uniformly mixed throughout the resin composition by agitation and thereafter the resin is injected into the mixing zone of the gun, as heretofore described. It has been found that when this additive and technique are employed, a marked reduction in formaldehyde out-gassing occurs.

The amount of calcium metasilicate mixed with the precondensate resin can vary considerably and the effect of formaldehyde suppression still results. Generally, it has been found satisfactory when from about 15 grams of calcium metasilicate per gallon of resin to about 125 grams of calcium metasilicate per gallon of resin, is employed. However it should be understood that these ranges are practical ranges. In other words, the out-gassing effect is minimized as long as some is added, but when the upper level expressed herein is exceeded, there is no additional practical gain achieved. Most preferably the amount of calcium metasilicate is from about 30 grams per gallon of resin to about 120 grams per gallon of resin with the very most preferred range being from about 60 grams of calcium metasilicate per gallon of resin to about 120 grams per gallon of resin.

The particle size of the calcium metasilicate does seem to have some effect. Preferably it is particulate and divided. However, for reasons unknown to the applicant, it seems that as long as it is particulate and divided, the coarser grades of calcium metasilicate seem to be more effective. By coarser grades, what is meant is a particle size of which about 2% is retained on a 200 mesh standard sieve screen. This appears to be the most satisfactory size, although finer grades may be employed which show 2% on a 325 mesh standard sieve screen, and even 400 mesh screen showing 2% on the screen.

The particular supplier of calcium metasilicate does not appear to be a critical factor, as long as the silicate employed is in fact calcium metasilicate. For example, magnesium trisilicate does not work, sodium silicate does not work, silicic acid itself does not work, rice silica does not work, pectolite does not work. Suitable calcium metasilicate can be obtained from the R. J. Vanderbilt Company, Inc., sold under the mark "Vansil -W-30; -W-20 and -W-10" which is preferred, but also NYAD, Wallastonite 325, 400 and G from Interpace Corporation, may also be employed.

It is, of course, also not critical to the invention how the precise urea formaldehyde precondensate resin, is modified for use in the foaming gun. In other words, modified urea formaldehyde resins may also be successfully employed, and the out-gassing of formaldehyde is still reduced.

It is common to modify urea formaldehyde resins with numerous modifying agents, such as phenol, resorcinol, acetaldehyde, alcohols, glycols, sugars, amines, and compounds closely related to urea in structure, such as melamine. Such modifiers again, are well known and are disclosed in the Beat-Meyer text previously incorporated by reference.

EXAMPLES

In the examples which are hereinafter presented a standard urea formaldehyde resin insulation make-up was employed. One gallon of a commercially available urea formaldehyde prepolymer solution containing 300 grams of urea/liter, formaldehyde in an excess of 5% over that needed for condensation with the urea to dimethylol urea, about 35 grams/liter of corn syrup plasticizer and minor amounts of melamine and furfuryl alcohol, was shaken vigorously with a slurry of calcium metasilicate, sold under the trademark Vansil W-10 which was mixed in about an equal weight of water. The resin component was then mixed with previously discussed first component (detergent-foamer) comprising an aqueous solution of a foaming agent containing a curing agent in the usual way, using the previously described foaming gun. The precise foaming agent was BASF Wyandotte W-5-14. Controls without the additive of the invention were made in the same manner.

As seen from the data presented in the tables, the resulting foam showed a smaller release of formaldehyde than a control sample without calcium metasilicate. The release of formaldehyde after four to five days was one-quarter of the control sample without the calcium metasilicate. Concentrations of calcium metasilicate were varied in additive level of from 30 grams of calcium metasilicate per gallon of resin, to about 60 grams per gallon of resin to 118 grams per gallon of resin. All levels had a similar effect on the release of formaldehyde.

Humidification of the foam insulation containing the calcium metasilicate additive did not increase the release of formaldehyde, in contrast to the behavior of the control sample.

In every instance, in preparing the samples of this invention, there was vigorous agitation to provide uniform distribution of the particulate divided calcium metasilicate, Vansil W-10 in the pre-condensate resin suspension. The particle size of the calcium metasilicate was 2% on a 200 mesh standard sieve screen, unless otherwise designated.

Three samples of the additive product and the control were placed in separate formaldehyde monitoring chambers and simultaneously compared. The three samples of varying additive concentration were compared to the control at an average temperature of 32° C. for 19 days (see Table I).

Free formaldehyde was determined by placing a 0.5 gram foam sample in 50 milliliters of distilled water at room temperature and blending in a mechanical blender for ten seconds. The sample was immediately filtered by suction and the filtrate diluted to 100 milliliters with deionized distilled water. Formaldehyde was then determined by chromotropic acid method. That is, the reaction of formaldehyde in solution with chromotropic acid (1, 8 dihydroxy naphthalene-3, 6-disulfonic acid, reagent grade obtained from J. T. Baker Chemical Company, and concentrated sulfuric acid (95%, analytical reagent, from the same company) forms a purple chromogen which absorbs at 580 nanometers. In this technique, from 0.1 to 2.0 parts per million can be measured in the ten milliliter volume of solution.

Temperature and relative humidity were controlled by using a combination of two metal environmental chambers.

Relative humidity was controlled within each chamber. The relative humidity of the air could be increased by heating the water in a humidifier. The procedure for checking formaldehyde emission was as follows:

Foam samples used for the emission study were foamed and allowed to cure for 12-27 hours before placing them in the small chambers. Emission studies were initiated upon placement of the samples in the chambers. The samples remained in the chambers for the duration of the observations.

Collection of air samples was performed using two graduated midget impingers (Ace Glass, Inc.) connected in series to a vacuum pump (E. I. Dupont De Nemours & Co., Inc., personal air sampling pump Model P4000 A) calibrated at one liter per minute. A glass tube was placed in the outlet of the chamber so that collection of air was taken from the middle of the chamber. With the impingers connected in series, the reported collection efficiency is 95%. Sampling was performed for 15 to 60 minutes with calibration of pumps before and after a day of sampling. After the sampling, the volume of the absorbing solution (1% sodium bisulfite solution) was measured and the solution transferred to a sample bottle for transport to the laboratory for formaldehyde determination.

Air samples were collected daily for the first ten days and on an average of four times a week thereafter.

As earlier mentioned, formaldehyde was determined using the chromotropic acid method, chosen because it is the recommended method of the National Institute of Occupational Safety and Health. A large number of samples were to be analyzed and the chromotropic acid method required the least time per sample per analysis while having good sensitivity and reproducibility.

The reaction of formaldehyde in solution with chromotropic acid (1,8-dihydroxynaphthalene-3,6-disulfonic acid, reagent grade, J. T. Baker Chemical Co.) and concentrated sulfuric acid (95%, analytical reagent, J. T. Baker Chemical Co.) forms a purple chromogen which absorbs at 580 nanometers ($\epsilon = 1.57 \times 10^3$). From 0.1 to 2.0 parts per million can be measured in the ten milliliter final volume of solution. This procedure has few interferences. Saturated aldehydes give less than a 0.01% positive interference and the unsaturated aldehyde acrolein results in a few percent positive interference. Ethanol and higher molecular weight alcohols and olefins are negative interferences. Methanol can be tolerated up to ten-thousandfold excess without interference. Phenols result in a 10-20% negative interference. However, most of these interferences mentioned were not likely to be encountered in the sample atmosphere.

Standards of formaldehydes for the calibration curve were prepared from a stock solution of approximately 1 part per thousand formaldehyde in deionized, distilled water. This stock solution was prepared by dissolving 4.4703 grams of sodium formaldehyde bisulfite (Eastman Kodak Company Cat. No. P6450) in one liter of deionized, distilled water. This solution was standardized using the method of Godman and Yagoda, Boyden, R. J., Greaves, J. and Downing, I. A., Chemical Abstract 87:P136982a (1972), incorporated herein by reference. One milliliter of formaldehyde solution, ten milliliters of 1% sodium bisulfite and one milliliter of 1% starch indicator solution were mixed and titrated with 0.1 N iodine (standardized with arsenic trioxide) to a dark blue color. The excess iodine was destroyed using a 0.05 N sodium thiosulfate and 0.01 iodine was added until a faint blue end-point was reached. The excess bisulfite was completely oxidized to sulfate. The bisulfite from the formaldehyde addition complex was liberated to the addition of chilled 25% sodium carbonate buffer (80 g of anhydrous sodium carbonate in 500 mL water, 20 mL of glacial acetic acid and diluted to one liter). The liberated sulfite was then titrated with 0.01 N iodine to a faint blue endpoint using a microburet. A 10 ppm standard solution was then prepared by diluting the formaldehyde stock solution.

TABLE I

| Age of Foam | RELEASE OF FORMALDEHYDE IN PARTS PER MILLION PER LITER AND MICROGRAMS PER M³ | | | | | | | |
|---|---|---|---|---|---|---|---|---|
| | No Additive (Control) | | 30 g. Additive | | 60 g./gal. Additive | | 118 g/gal. Additive | |
| (Days) | μL/L | μg/m³ | μL/L | μg/m³ | μL/L | μg/m³ | μL/L | μg/m³ |
| 0 | | | | | | | | |
| 1.0 | 72.5 | 88900 | 48.4 | 59400 | 51.5 | 63200 | 43.7 | 53600 |
| 1.1 | 60.6 | 74400 | 38.2 | 46900 | 39.9 | 49000 | 34.8 | 42700 |
| 1.8 | 54.8 | 67300 | 27.0 | 33100 | 21.8 | 26800 | 23.0 | 28200 |
| 3.9 | 10.5 | 12900 | 0.95 | 1170 | 0.56 | 693 | 0.40 | 491 |
| 4.9 | 5.14 | 6310 | 0.53 | 652 | 0.45 | 550 | 0.23 | 280 |
| 6.0 | 2.50 | 3070 | 0.34 | 420 | 0.26 | 324 | 0.14 | 160 |
| 7.0 | 2.39 | 2930 | 0.35 | 432 | 0.28 | 339 | 0.16 | 202 |
| 10.1 | 2.42 | 2970 | 0.43 | 526 | 0.24 | 299 | 0.35 | 423 |
| 11.1 | 1.83 | 2250 | 0.33 | 404 | 0.29 | 352 | 0.16 | 199 |
| 12.0 | 2.02 | 2480 | 0.31 | 380 | 0.27 | 333 | 0.16 | 198 |
| 13.0 | 1.44 | 1770 | 0.24 | 298 | 0.18 | 221 | 0.12 | 142 |
| 14.0 | 1.51 | 1850 | 0.23 | 286 | 0.25 | 309 | 0.14 | 175 |
| 15.0 | 1.45 | 1780 | 0.26 | 321 | 0.22 | 273 | 0.13 | 153 |
| 18.0 | 2.89 | 3550 | 0.59 | 724 | 0.63 | 768 | 0.25 | 304 |
| 19.0 | 2.50 | 3070 | 0.56 | 691 | 0.56 | 687 | 0.24 | 296 |

μ = micro, figures correspond to parts per million level.

The effect of particle size on the release of formaldehyde is presented in the following Table II.

TABLE II
EFFECT OF PARTICLE SIZE ON FORMALDEHYDE RELEASE

| Age of Foam (Days) | Chamber Formaldehyde Concentration ($\mu$L/L) | | |
|---|---|---|---|
| | Control | Vansil W-10* | Vansil W-20* |
| 1.0 | | 41.5 | 51.2 |
| 1.1 | 56.1 | | |
| 2.8 | | 0.62 | 1.51 |
| 5.2 | 3.3 | | |
| 6.8 | | 0.30 | 0.84 |
| 8.0 | 2.4 | | |
| 12.0 | 2.5 | | |
| 12.8 | | 0.10 | 0.48 |
| 17.9 | 1.2 | | |

*Addition level at 60 g/gallon of resin in both cases. W-10 has a coarser particle size of 2% on a 200 mesh screen, and W-20 is finer with 2% on a 325 mesh screen.

The free formaldehyde concentration of the foam as a function of time is presented in Table III. As can be observed, the free formaldehyde content of control decreases steadily with time.

TABLE III
FREE FORMALDEHYDE CONCENTRATION AS A FUNCTION OF TIME

| Day | Sample | Conc ($\mu$g/g) | Conc ($\mu$g/cm$^3$) |
|---|---|---|---|
| 1 | Control | 8920 | 448 |
| 1 | 30 g/additive | 16400 | 650 |
| 1 | 60 g/additive | 10600 | 429 |
| 1 | 118 g/additive | 12000 | 518 |
| 20 | Control | 3670 | 78.2 |
| 20 | 30 g/additive | 4770 | 90.2 |
| 20 | 60 g/additive | 28800 | 619.0 |
| 20 | 118 g/additive | 32000 | 474.0 |
| 27 | Control | 4270 | 91.0 |
| 27 | 30 g/additive | 3970 | 75.1 |
| 27 | 60 g/additive | 13500 | 290.0 |
| 27 | 118 g/additive | 25800 | 382.0 |

After 19 days, the temperature of the chambers in which the previously described samples were contained were raised to 36° C. The effect of this temperature change on the samples is tabulated in Table IV. From this data, an increase in formaldehyde release for the control only was observed. The formaldehyde release for the three samples of the invention did not have the degree of temperature dependence when compared to the control.

TABLE IV
EFFECT OF TEMPERATURE ON THE RELEASE OF FORMALDEHYDE

| Age of Foam (Days) | Control | | 30 g/additive | | 60 g/additive | | 188 g/additive | |
|---|---|---|---|---|---|---|---|---|
| | $\mu$L/L | $\mu$g/m$^3$ | $\mu$L/L | $\mu$g/m$^3$ | $\mu$L/L | $\mu$g/m$^3$ | 82 L/L | $\mu$g/m$^3$ |
| 19.0 | 2.5 | 3070 | 0.56 | 691 | 0.56 | 687 | 0.24 | 296 |
| Temperature in Chamber raised from 32° C. to 36° C. | | | | | | | | |
| 19.0 | 3.71 | 4560 | 0.60 | 742 | 0.54 | 666 | 0.29 | 355 |
| 25.1 | 3.00 | 3680 | 0.54 | 666 | 0.52 | 643 | 0.30 | 366 |
| 26.8 | 1.97 | 2420 | 0.43 | 528 | 0.43 | 529 | 0.23 | 277 |
| 27.9 | 1.80 | 2200 | 0.40 | 495 | 0.42 | 520 | 0.18 | 220 |
| 28.8 | 1.97 | 2390 | 0.54 | 667 | 0.48 | 585 | 0.25 | 306 |
| 31.9 | 2.29 | 2810 | 0.51 | 628 | 0.47 | 578 | 0.23 | 287 |
| 32.8 | 1.73 | 2120 | 0.39 | 484 | 0.46 | 562 | 0.18 | 221 |
| 35.8 | 1.60 | 1960 | 0.36 | 437 | 0.32 | 387 | 0.13 | 165 |
| 38.8 | 1.52 | 1870 | 0.32 | 389 | 0.27 | 329 | 0.13 | 110 |
| 40.0 | 1.39 | 1710 | 0.32 | 394 | 0.31 | 386 | 0.16 | 200 |
| 41.85 | 1.64 | 2010 | 0.41 | 504 | 0.34 | 423 | 0.19 | 234 |
| 45.8 | 1.35 | 1660 | 0.33 | 403 | 0.15 | 181 | 0.15 | 184 |

Finally, in an effort to determine whether the use of calcium metasilicate was unique, other additives that were similar in chemical composition were studied with respect to formaldehyde release. The impact of change in chemical composition or structure of the additive is observed in Table V.

TABLE V
EFFECT OF ALTERED ADDITIVES ON FORMALDEHYDE RELEASE

| | Formaldehyde Release ($\mu$L/L) | | | | |
|---|---|---|---|---|---|
| Age of Foam (Days) | Sample 1 Mg tri-silicate | Sample 2 Soluble SiO$_2$ | Control for Sample 1&2 | Sample 3 fine SiO$_2$ (rice silica) | Control for Sample 3 |
| 1.1 | | | | 39.1 | 56.1 |
| 1.3 | 62.5 | 43.8 | 56.7 | | |
| 1.9 | 42.8 | 37.1 | 46.6 | | |
| 2.1 | 41.5 | 36.7 | 44.6 | | |
| 3.0 | 9.0 | 17.3 | 14.2 | | |
| 4.1 | 3.4 | 6.8 | 5.7 | | |
| 5.0 | 2.8 | 5.2 | 4.9 | | |
| 5.2 | | | | 1.9 | 3.3 |
| 6.0 | 2.2 | 3.8 | 3.5 | | |
| 7.1 | 1.8 | 3.2 | 3.1 | | |
| 8.0 | 1.7 | 3.1 | 2.9 | 0.92 | 2.4 |
| 8.9 | 1.9 | 2.9 | 2.8 | | |
| 12.0 | | | | 1.10 | 2.5 |
| 17.9 | | | | 0.57 | 1.2 |

It can be seen that the only additive which provided for significant control of formaldehyde release was the calcium metasilicate of this invention.

What is claimed is:

1. A urea-formaldehyde foamed insulation composition prepared from a first and second component, said first component comprising an aqueous solution of a foaming agent and said second component comprising an aqueous solution of a pre-condensate urea-formaldehyde resin,
    said second component containing as a formaldehyde decomposition suppressant, a small but suppression effective amount of a calcium metasilicate.

2. The foamed insulation product of claim 1 wherein the amount of said calcium metasilicate in said pre-condensate resin is from about 15 grams per gallon of resin to about 125 grams per gallon of resin.

3. The foamed insulation of claim 2 wherein the amount of said calcium metal silicate is from about 30 grams per gallon of resin to about 120 grams per gallon of resin.

4. The foamed insulation of claim 3 wherein the amount of said calcium metal silicate is from about 60 grams per gallon of resin to about 120 grams per gallon of resin.

5. The foamed insulation of claim 1 wherein the particle size of said calcium metasilicate is from about 2% retained on a 200 mesh standard sieve.

6. A method of decreasing formaldehyde outgassing from urea-formaldehyde foamed insulation prepared from a first and second component, said first component comprising an aqueous solution of a foaming agent and said second component comprising an aqueous solution of a pre-condensate urea-formaldehyde resin, comprising:

adding to said second component as a formaldehyde emission suppressant a small but effective amount of divided, particulate calcium metasilicate.

7. The method of claim 6 wherein said calcium metasilicate is substantially uniformly dispersed through said resin component.

* * * * *